(12) United States Patent
Hammer et al.

(10) Patent No.: US 6,703,058 B1
(45) Date of Patent: Mar. 9, 2004

(54) FOOD CASING HAVING A RELEASE PREPARATION ON THE INSIDE

(75) Inventors: Klaus-Dieter Hammer, Mainz (DE); Michael Ahlers, Mainz (DE); Theo Karns, Kiedrich (DE)

(73) Assignee: Kalle GmbH & Co. KG. (DE)

( * ) Notice: Subject to any disclaimer, the term of this patent is extended or adjusted under 35 U.S.C. 154(b) by 0 days.

(21) Appl. No.: 09/546,319

(22) Filed: Apr. 7, 2000

(30) Foreign Application Priority Data

Apr. 9, 1999 (DE) .......................... 199 16 121

(51) Int. Cl.$^7$ .............................................. A22C 13/00
(52) U.S. Cl. .................... 426/135; 138/118.1; 428/34.8
(58) Field of Search .................. 426/105, 135; 428/34.8; 138/118.1

(56) References Cited

U.S. PATENT DOCUMENTS

| | | |
|---|---|---|
| 2,709,138 A | 5/1955 | Weingaud et al. |
| 2,901,358 A | 8/1959 | Underwood ............. 138/118.1 |
| 3,158,492 A | 11/1964 | Firth |
| 3,442,663 A | 5/1969 | Turbank |
| 3,558,331 A | 1/1971 | Tarika |
| 3,753,740 A | 8/1973 | Turbak |
| 3,818,947 A | 6/1974 | Rose |
| 3,945,404 A | 3/1976 | Yamamatsu et al. ..... 138/118.1 |
| 4,543,282 A | 9/1985 | Hammer et al. ............... 428/36 |
| 5,358,784 A | 10/1994 | Hammer et al. ........... 428/34.8 |
| 5,370,914 A | 12/1994 | Hammer et al. ........... 428/34.8 |
| 5,595,796 A | 1/1997 | Hammer et al. ........... 428/34.8 |

FOREIGN PATENT DOCUMENTS

| | | |
|---|---|---|
| DE | 966194 | 7/1957 |
| DE | 2546681 | 4/1976 |
| DE | 2853269 | 6/1980 |
| DE | 3447026 | 7/1985 |
| EP | 0180207 | 5/1986 |
| EP | 0462393 | 12/1991 |
| EP | 0468284 | 1/1992 |
| GB | 1042182 | 4/1966 |

*Primary Examiner*—Arthur L. Corbin
(74) *Attorney, Agent, or Firm*—Connolly Bove Lodge & Hutz LLP

(57) ABSTRACT

The present invention relates to a tubular food casing based on cellulose hydrate which is impregnated and/or coated on its inner surface with a release preparation. The release preparation comprises (a) at least one reactive hydrophobicizing component, (b) at least one non-reactive release component and (c) at least one oil component and/or lecithin component.

15 Claims, No Drawings

FOOD CASING HAVING A RELEASE PREPARATION ON THE INSIDE

BACKGROUND OF THE INVENTION

1. Field of the Invention

The present invention relates to a tubular food casing based on cellulose hydrate which is impregnated and/or coated on its inner surface with a release preparation.

2. Description of Related Art

Sausage-meat stuffing types and meat types which have relatively high protein and low fat contents adhere particularly firmly to food casings based on regenerated cellulose. To reduce the adhesion and thus to be able to remove the casing more easily, various release preparations have been developed which are applied to the inner surface of the casing.

For example, DE-A 966 194 describes a reactive preparation which comprises N-alkylethyleneimines or alkyl isocyanates. The ethyleneimine or isocyanate groups react with hydroxyl groups of the cellulose, so that the active compound is fixed to the casing material. U.S. Pat. No. 2,901,358 describes a cellulose-based sausage casing which is impregnated with a chromium-fatty acid complex. Diketenes are included in the impregnation according to DE-A 14 92 699, and they are applied to the inside of the sausage casing, preferably in the form of an aqueous emulsion, in a mixture with lower alkyl celluloses. The compounds react with the cellulose and therefore become fixed to the casings; however, they may also be detached relatively readily from the sausage-meat stuffing. As such inner coatings prepared therewith are frequently not uniformly thick and are not continuous, the release action may also be uneven.

In addition, non-reactive release preparations are known. For example according to DE-A 25 46 681, an essentially homogeneous mixture of a water-soluble cellulose ether, mono- and diglycerides of oleic acid and, if appropriate, a partial fatty ester of sorbitan or mannitan, are applied to the inside of the casing, and the coating is dried. In a similar manner, for example, according to DE-A 23 06 338 a mixture of a mineral oil, an acetylated fatty acid monoglyceride and an acetylated, surface-active agent which is only sparingly soluble in the mineral oil are applied onto the inside of the cellulose casing. DE-A 28 53 269 teaches an inner coating composed of a water-soluble cellulose ether and a poly-alkylenepolyamine or salts thereof and/or a reaction product of an epichlorohydrin with a polyamide, of a modified melamin with formaldehyde and/or of a modified urea with formaldehyde, with these resins being soluble or dispersible in water. The release action which may be achieved with the previously known reactive and non-reactive release preparations, is still insufficient for a number of sausage varieties, in particular blood sausage. That is, on places the casing remains stuck to the emulsion surface, so that during peeling, emulsion and/or meat parts are torn out. This is a particular problem in the case of stacked slices. This is because when preparing stacked sausage slices, the sausage is peeled on automatic units before it is sliced. Modern peeling apparatuses operate at high speed. Stuffing pieces being torn out would lead to serious problems or interferences with production. In addition, sausage casings should generally be capable of being peeled from the end region of the sausage without difficulty or problems. In the case of long-keeping or aged sausage products, however, the release action must not be too great, since otherwise there is a risk that the casing will detach ("peel off") from the sausage during the ripening period (which is generally about 18 days).

SUMMARY OF THE INVENTION

An object of the present invention was to produce a food casing which can be peeled readily.

This object as well as other objects of the present invention can be achieved for example, by employing a combination of a non-reactive release component with a reactive release component and an oil and/or lecithin.

The present invention therefore relates to a tubular food casing comprising cellulose hydrate, wherein the casing is impregnated or coated on its inner surface with a release preparation, and wherein the release preparation comprises:

a) a reactive hydrophobicizing component, b) a non-reactive release component and c) an oil and/or lecithin component.

Additional objects, features and advantages of the invention will be set forth in the description which follows, and in part will be obvious from the description, or may be learned by practice of the invention. The objects, features and advantages of the invention may be realized and obtained by means of the instrumentalities and combinations particularly pointed out in the appended claims.

DETAILED DESCRIPTION OF A PREFERRED EMBODIMENT

The improved release action of the present invention can be achieved using coating compositions or preparations which are easy to handle. When the casings are soaked prior to stuffing with meat, loss of the preparation is minimized. The release action is generally sufficient, even for high-protein and low-fat emulsion types or meat types, such as blood sausage, scalded-emulsion poultry sausage, lean, cured and smoked loin of pork and breast of poultry.

The reactive hydrophobicizing component a) is preferably a chromium-fatty acid complex, a diketene having long-chain ($C_{10}$–$C_{26}$)alkyl radicals, a ($C_{10}$–$C_{26}$)-alkyl isocyanate and/or a reactive silicone. However, any reactive hydrophobicizing component or mixture can be employed. Stearic acid/chromic acid chloride complexes may particularly be mentioned as advantageous in some embodiments. For example, a chromium-fatty acid complex having a 25% solids content which contains 5% by weight of chromium, 7.8% by weight of chlorine and 11.8% by weight of long-chain ($C_{14}$–$C_{18}$) fatty acids is commercially available. In addition, an alkyldiketene having a 7.6% solids content and a ketene dimer content of 6% by weight is also highly suitable. This product is also commercially available.

Any known non-reactive release component b) can be used and is preferably a cellulose derivative, in particular carboxylmethyl cellulose, hydroxy-ethyl cellulose or methylhydroxyethyl cellulose, an alginate or chitosan.

Any known oil, lecithin or mixture can be employed as the component c), and c) is preferably a natural or synthetic oil, in particular olive oil, sunflower seed oil or rapeseed oil, a synthetic triglyceride made from medium-chain fatty acids (that is to say those having from 6 to 12 carbon atoms), a paraffin oil, a silicone oil or lecithin. The oil or lecithin should generally cause a uniform distribution of the release preparation on the inner surface of the casing. It should also facilitate the shirring and processing of the casing in use.

The release preparation is preferably applied to an inner surface of the cellulose-based food casing preferably in such an amount that the finished casing comprises, per square meter, preferably from 50 to 350 mg, advantageous from 70 to 250 mg, of reactive hydrophobicizing component a), preferably from 30 to 300 mg, advantageously from 50 to 150 mg, of non-reactive release component b) and preferably from 50 to 700 mg, advantageously from 80 to 300 mg, of oil and/or lecithin.

The cellulose-based food casing comprises, prior to the application of the impregnation or the coating, more than 60% by weight, preferably more than 80% by weight of cellulose, based on the total dry weight of the casing.

The components a), b) and c) act synergistically together and as a result, cause a release effect which has not been achieved before. The release effect obtained is desirable or even demanded for some particularly highly adhering fillings, such as the above-mentioned blood sausage, smoked and cured loin of pork, or others. The individual components alone, in contrast, generally do not give the desired effect. It is assumed that the component a) which reacts with the cellulose, modifies the inner surface; that the non-reactive component b) and the oil and/or lecithin c) are uniformly distributed thereon and become bound simultaneously. It is desirable that all three components of the release preparation be applied together in most cases, as opposed to sequentially.

To prepare the food casing of the invention, the components a), b) and c) are preferably mixed together and applied to the inner surface in the form of an aqueous composition. Expediently, the oil and/or the lecithin is converted in advance into a stable oil-in-water emulsion, preferably by homogenization. Suitable emulsifiers include one or more food-grade alkylsulfonates or alkylarylsulfonates or alkyl sulfates or alkylaryl sulfates, nonionic ethoxylates of fatty alcohols (these are monohydric alcohols having from 8 to 22 carbon atoms in unbranched chains) or of fatty amines (these are mixtures of long-chain, predominantly primary alkylamines) and mono-esters of fatty acids and polyhydric alcohols (for example sorbitolmonooleyl ester). They are generally used in an amount of from 0.5 to 10% by weight, preferably from I to 5% by weight, in each case based on the weight of the oil and/or lecithin. The components a) and b) are preferably dissolved or emulsified in water and mixed with the emulsion of component c).

In the aqueous preparation mixture, the content of the reactive component a) is suitably from 0.5 to 10.0% by weight, more preferably from 1.0 to 6.0% by weight, in each case based on the total weight of the mixture. The content of the non-reactive component b) is preferably lower than the content of the reactive component a). It is preferably from 0.5 to 5.0% by weight, preferably from 1.0 to 3.0% by weight, again based on the total weight of the mixture. The content of oil or lecithin, finally, is preferably from 1.0 to 20.0% by weight, more preferably from 2.0 to 12.0% by weight. In addition, the mixture can comprise other customary additives, in particular secondary plasticizers, such as glycerol. The plasticizer content is advantageously from 5 to 20% by weight, preferably from 8 to 15% by weight. It should correspond as far as possible to the secondary plasticizer content already present in the cellulose hydrate casing, so that an equilibrium state can be set. Suitable customary additives are also disclosed in U.S. Pat. No. 5,370,914 which is incorporated herein by reference in its entirety.

The preparation thus produced is then preferably stuffed into a cellulose gel tube, which has previously been run through precipitation, wash and plasticizer baths, but before the tube (casing) has reached the drier stage. The preparation is held in a gel tube loop which is continuously being formed (this type of coating is generally known as "slug coating"). The prepared tubes are then dried in the inflated state and horizontally in the drier at from 90 to 130° C., as is customary, then moistened to the desired final moisture content (customarily from about 8 to 10%) and wound up.

In a preferred embodiment, the internally prepared cellulose casing of the invention has an internal reinforcement of fibrous material, in particular of hemp fibers. To produce internal fiber reinforcement, customarily the fibrous material is first formed into a tube which is then treated with viscose on the inside or outside or from both sides (that is, internally, externally or double-viscose-treated tube). The unreinforced or fiber-reinforced cellulose gel tube can be produced by processes which are customary and known to those skilled in the art. Suitable processes include, in particular, the viscose process and the N-methylmorpholine N-oxide (NMMO) process as are known to those of ordinary skill in the art. In the viscose process, the cellulose is converted into cellulose xanthogenate, which is then regenerated back to cellulose in the precipitation bath. In the NMMO process, the cellulose, in contrast, is dissolved in the NMMO in chemically unchanged form.

The examples below illustrate the invention. Percentages are percentages by weight, unless stated otherwise.

EXAMPLE 1

Into an externally viscose-treated cellulose hydrate gel tube having a diameter of 90 mm (=caliber 90) there were charged, prior to the entry into the drier, about 12 liters of a mixture of

| | |
|---|---|
| 30 l | of alkyldiketene in water (alkyldiketene content: 7.6%), |
| 6 l | of glycerol, |
| 0.45 l | of 4% strength aqueous NaOH, |
| 0.12 kg | of carboxymethyl cellulose, |
| 0.24 l | of a synthetic triester of glycerol and ($C_8$–$C_{10}$)-fatty acids (a 50% strength emulsion was used) and |
| 23.3 l | of water. |

The release preparation therefore comprised 3.8% of alkyldiketene, 10.0% of glycerol, 2.0% of carboxymethyl cellulose and 2.0% of triglyceride. The tube is, as is customary, dried in the inflated state, then moistened to from 8 to 10% residual moisture content and wound up. After storage for about 3 weeks in the form of sections tied off at one end or in shirred form as shirred stick, the casings were stuffed with Thuringer Blutwurst (Thuringian blood sausage), cooked and then smoked. The casing could be taken off without difficulty thereafter without emulsion residues adhering thereto. The sausage may therefore be processed to stacked slices without problems.

EXAMPLE 2

Into an externally viscous-treated cellulose hydrate gel tube of caliber 140, prior to entry into the drier, there were charged about 22 liters of the following composition:

| | |
|---|---|
| 15 l | of chromium-fatty acid complex (the commercial product was diluted 1:10 with water), |
| 9 l | of glycerol, |

-continued

| | |
|---|---|
| 0.12 kg | of hydroxyethyl cellulose, |
| 0.36 l | of a synthetic triester of glycerol and ($C_8$–$C_{10}$)-fatty acids (a 50% strength emulsion was used) and |
| 35.64 l | of water. |

The release preparation therefore comprises 0.65% of chromium-fatty acid complex, 15.0% of glycerol, 2.0% of hydroxyethyl cellulose and 3.0% of triglyceride.

The tube was, as is customary, dried in the inflated state, then moistened with water to a final moisture content of from 8 to 10% and wound up.

Lean cooked ham was then charged using a Futuba stuffing apparatus. After the scalding and smoking, the casing could be taken off readily over the entire length.

EXAMPLE 3

Into an externally viscose-treated cellulose hydrate gel tube of caliber 75, prior to entry into the drier, there were charged about 10 liters of the following composition:

| | |
|---|---|
| 176 l | of water, |
| 20 l | of glycerol, |
| 2 l | of chromium-fatty acid complex, |
| 2 l | of lecithin, |
| 3 l | of a 10% strength aqueous NaOH solution, |
| 33 l | of hydroxyethyl cellulose (a 20% strength aqueous solution was used) and |
| 14 l | of silicone oil emulsion E2 (40% strength). |

The release preparation therefore comprised 2.1% of chromium-fatty acid complex, 8.0% of glycerol, 2.64% of hydroxyethyl cellulose and 2.2% of silicone oil.

The tube was, as is customary, dried in the inflated state, then moistened with water to a final moisture content of from 8 to 10% and wound up. In a further processing step, the tube was then sprayed with water until it had a moisture content of from 16 to 18% and then shirred. The tube was then used for encasing lean, cured, smoked pork. After scalding and smoking, the tubular casing could be peeled off without problems. No unwanted adhesion to the lean pork was observed.

COMPARISON EXAMPLE

Into an externally viscose-treated cellulose hydrate gel tube having a diameter of 90 mm (=caliber 90), prior to the entry into the drier, there were charged about 12 liters of a mixture of

| | |
|---|---|
| 30 l | of alkyldiketene in water (alkyldiketene content: 7.6%), |
| 6 l | of glycerol, |
| 0.45 l | of 4% strength aqueous NaOH, |
| 0.12 kg | of carboxymethyl cellulose and |
| 23.3 l | of water. |

The release preparation therefore comprised 3.8% of alkyldiketene, 10.0% of glycerol and 2.0% of carboxymethyl cellulose. The tube was, as is customary, dried in the inflated state, then moistened to a final moisture content of from 8 to 10% and wound up. After storage for about 3 weeks in the form of sections tied off at one end or in shirred form as shirred stick, the casings were stuffed with Thuringer Blutwurst, cooked and then smoked. When the casing was taken off, emulsion residues (especially rind) remained stuck in places.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

The priority document, German Patent Application No. 199 16 121.6, filed Apr. 9, 1999 is incorporated herein by reference in its entirety.

As used herein and in the following claims, articles such as "the", "a" and "an" can connote the singular or plural.

All documents referred to herein are specifically incorporated herein by reference in their entireties.

What is claimed is:

1. A tubular food casing comprising cellulose hydrate, wherein said casing is impregnated or coated on an inner surface thereof with a release preparation, wherein the release preparation comprises (a) at least one reactive hydrophobicizing component selected from the group consisting of a diketene having long-chain ($C_{10}$–$C_{26}$)alkyl radicals, a ($C_{10}$–$C_{26}$)alkyl cyanate and a reactive silicone, (b) at least one non-reactive release component and (c) at least one oil and/or lecithin selected from the group consisting of (i) natural or synthetic oil, (ii) a synthetic triglyceride of medium-chain fatty acids, (iii) a paraffin oil, and (iv) lecithin.

2. A casing as claim 1, wherein the non-reactive release component b) is a cellulose derivative, an alginate or chitosan.

3. A casing as claimed in claim 2, wherein said cellulose derivative comprises carboxymethyl cellulose, hydroxymethyl cellulose or methylhydroxyethyl cellulose.

4. A casing as claimed in claim 1, wherein said casing comprises, per square meter, from 50 to 350 mg of said reactive hydrophobicizing component (a), from 30 to 300 mg, of said non-reactive release component (b) and from 50 to 700 mg, of said oil and/or lecithin (c).

5. A casing as claimed in claim 4, wherein said (a) is present in an amount from 70 to 250 mg, and/or said (b) is present in an amount from 80 to 300 mg.

6. A casing as claimed in claim 1, wherein the oil and/or the lecithin is present in the release preparation in emulsified form.

7. A casing as claimed in claim 6, wherein said emulsified form is prepared using at least one emulsifier comprising alkylsulfonates or alkylarylsulfonates or alkylsulfates or alkylarylsulfates, nonionic ethoxylates of fatty alcohols or of fatty amines, or monoesters of fatty acids and polyhydric alcohols.

8. A casing as claimed in claim 1, wherein the content of the reactive hydrophobicizing component (a) is from 0.5 to 10.0% by weight, the content of the rion-reactive release component (b) is from 0.5 to 5.0% by weight, and the content of the oil component and/or lecithin component (c) is from 1.0 to 20.0% by weight, in each case based on the total weight of the release preparation.

9. A casing as claimed in claim 8, wherein said (a) is present in an amount from 1.0 to 6.0% by weight, said (b) is present in an amount from 1.0 to 3.0% by weight and/or said (c) is present in an amount from 2.0 to 12.0% by weight.

10. A casing as claimed in claim 8, wherein the release preparation comprises at least one additive.

11. A casing as claimed in claim 10, wherein said additive comprises a secondary plasticizer.

12. A casing as claimed in claim 11, wherein said secondary plasticizer comprises glycerol.

13. A casing as claimed in claim 11, wherein the content of said secondary plasticizer is from 5 to 20% by weight, based on the total weight of the release preparation.

14. A casing as claimed in claim 13, wherein said content of said secondary plasticizer is from 8–15% by weight, based on the total weight of the release preparation.

15. A casing as claimed in claim 1, wherein said natural oil comprises olive oil, sunflower seed oil or rapeseed oil.

* * * * *

UNITED STATES PATENT AND TRADEMARK OFFICE
CERTIFICATE OF CORRECTION

PATENT NO. : 6,703,058 B1
DATED : March 9, 2004
INVENTOR(S) : Klaus-Dieter Hammer et al.

It is certified that error appears in the above-identified patent and that said Letters Patent is hereby corrected as shown below:

Title page,
Item [54], should read as follows:

-- [54] FOOD CASING BASED ON CELLULOSE HYDRATE HAVING A RELEASE PREPARATION ON THE INSIDE --

Signed and Sealed this

First Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,703,058 B1  Page 1 of 1
APPLICATION NO. : 09/546319
DATED : March 9, 2004
INVENTOR(S) : Klaus-Dieter Hammer et al.

It is certified that error appears in the above-identified patent and that said Letters Patent is hereby corrected as shown below:

On the Title page; item [75]

In the Inventor section, please delete "Karns" and insert --Krams--.

Col. 6, in claim 3, line 2, please delete "hydroxym-ethyl" and insert --hydroxyl-methyl--.

Col. 6, in claim 8, line 3, please delete "rion-reaction" and insert --non-reactive--.

Signed and Sealed this

Twenty-fourth Day of April, 2007

JON W. DUDAS
*Director of the United States Patent and Trademark Office*